Patented Jan. 2, 1923.

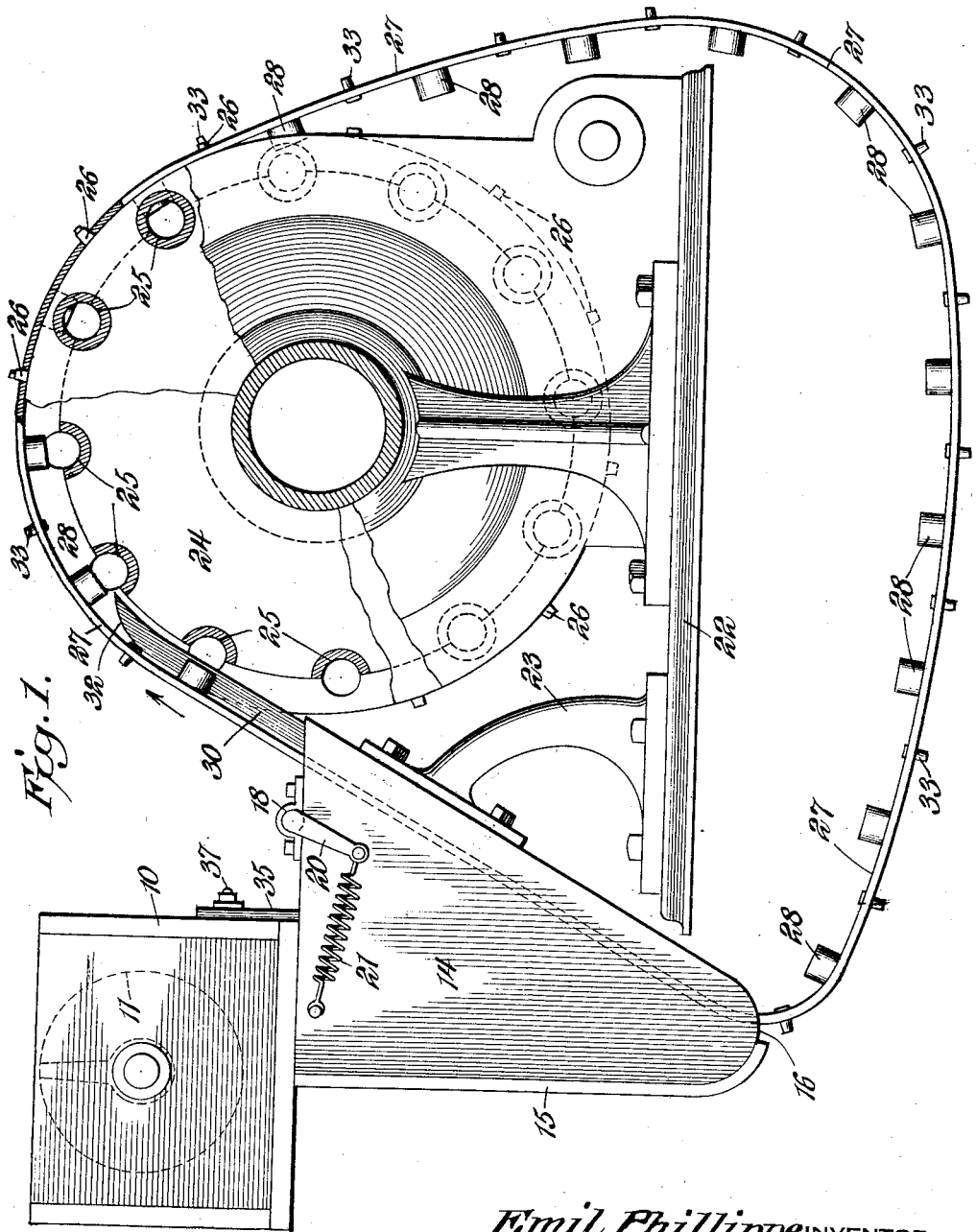

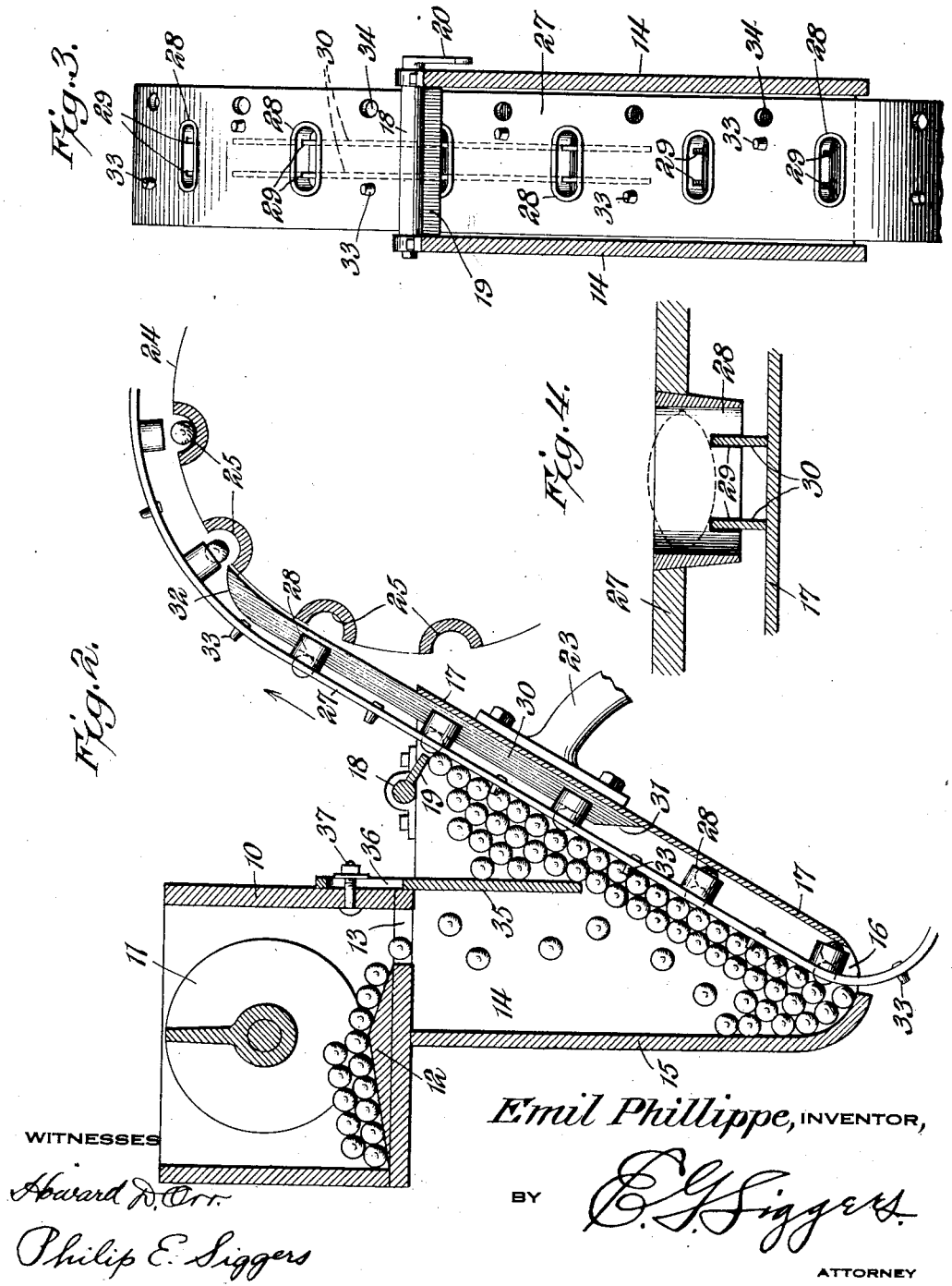

1,440,744

UNITED STATES PATENT OFFICE.

EMIL PHILLIPPE, OF SAN ANTONIO, TEXAS, ASSIGNOR TO G. A. DUERLER MFG. COMPANY, OF SAN ANTONIO, TEXAS, A CORPORATION OF TEXAS.

FEEDING MECHANISM FOR NUT-CRACKING MACHINES.

Application filed December 18, 1920. Serial No. 431,597.

*To all whom it may concern:*

Be it known that I, EMIL PHILLIPPE, a citizen of the United States, residing at San Antonio, in the county of Bexar and State of Texas, have invented a new and useful Feeding Mechanism for Nut-Cracking Machines, of which the following is a specification.

This invention relates to feeding mechanism for nut cracking machines.

An object of the invention is to provide a feeding mechanism for the type of nut cracking machine disclosed in the patent to Gebhardt, No. 1,133,121, March 23, 1915.

Other objects of the invention are to provide a nut feeding means the belt of which is driven directly by the drum of the nut cracking machine, which delivers a single nut to each of the pockets or sleeves of said machine, which cannot choke or feed more than a single nut at a time, and which in general is rapid yet direct and certain in action and of the utmost simplicity in construction. Further objects will appear as the description is proceeded with.

The invention in a preferred embodiment employs a continuous feed belt having cups at intervals each of a size to hold two nuts. Means are provided whereby these cups are successively filled and whereby after being filled all but one of the nuts is pushed out of each cup. Again, there is provision made so that the nuts drop out of the bottoms of the cups without rebounding. The belt itself carries stirring means for the nuts and directly engages with the drum of the machine so that it travels as a consequence of such engagement alone, thereby dispensing with the use of driving sprockets.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is an elevation of the improved mechanism shown in connection with a cracking machine, the latter being shown partly in vertical section.

Fig. 2 is a vertical section through the feeding mechanism proper, part of the belt being omitted.

Fig. 3 is a detail view showing the association of the feeding belt, the hopper and the track.

Fig. 4 is a detail cross sectional view showing a nut in one of the cups of the belt elevated therein by the track or nut raising rails.

The numeral 10 designates a box or housing in which a screw conveyer 11 is mounted. This housing and its conveyer are more or less conventional, being merely illustrative of any means useful in bringing a quantity of nuts to the feeding mechanism proper. The bottom of box 10 has a hip or peak 12 therein, and at one end an outlet 13 is provided. Directly below the outlet 13 a hopper 14 is secured. This hopper has the wall 15 vertical for the greater part of its length but curved at the lower end so as to provide a bottom for the hopper. The opposite wall 17 of the hopper is inclined with respect to the wall 15, and at its lower end is spaced from the corresponding end of wall 15 so as to provide an opening 16. This hopper, and if desired the conveyer housing 10, is supported upon a bracket 23 secured to the base 22 of the nut cracking machine. The arrangement is such that the wall 17 extends in a plane substantially tangent to the drum of the machine.

The cracking machine drum or carrier 24 has a plurality of sleeves or pockets 25 adapted to receive one nut at a time. The cracking machine is modified for the purposes of the present invention in that teeth or spurs 26 extends outwardly from the periphery of the drum. Except in this detail, the machine indicated in the drawing may have the same construction as the nut cracking mechanism described in the patent referred to. The belt 27, which may be of leather, has a plurality of holes 34 at suitable intervals whereby the teeth 26 on the drum or carrier may drive the belt. The belt also carries a plurality of cups 28, these cups preferably being of brass or other metal and preferably of oval shape with their upper edges thickest where they engage with the belt and their lower ends or edges relatively thin. The cups have no bottoms. These cups extend transversely of the belt at intervals equal to the arcuate distance between the sleeves 25 of the drum or carrier. The longitudinal walls of each cup are oppositely slotted as indicated at 29, these slots being spaced from the upper edge of each cup a distance substantially equal to the thickness of a single nut.

The belt 27 is designed to travel in the direction indicated by arrow heads, passing through the hopper 14, entering the hopper by way of the opening 16. The drum of the cracking machine is the only driving means for the belt, there being no idlers, sprockets or pulleys employed. As each cup enters the hopper, its open bottom is substantially closed by the wall 17. The nuts which are carried in the hopper will fall into the cups successively presented so that each cup will receive at least two of the nuts. As the belt travels upwardly through the hopper its cups encounter a pair of rails 30 having beveled lower ends 31. These rails are secured to the wall 17, making a right angle therewith, and extend above the hopper to a point adjacent the periphery of the drum. The two rails enter the slots 29 of each cup, thus providing a lifting or ejecting means which causes the upper of the two nuts to be forced out of each cup (see Fig. 2). The belt is supported by the engagement of the upper or outer edges of the rails with the upper or inner ends of slots 29, and at the same time the nut in each cup is supported by the rails sliding over the edges of the same as the belt progresses. The weight of the nuts in the hopper prevents any possibility of the nuts thus individually carried in each cup from being displaced. The top end of each rail 30 is rounded off as indicated at 32 to a point so that as each cup approaches the end of the track, the nut 6 gradually sinks down in the cup and finally falls out of the same and is deposited gently into each pocket or sleeve 25. Where the ends of the rails cut off squarely the nuts would be dropped with sufficient force into the sleeves to cause a re-bound. This rebound might be sufficient to entail loss or misplacement of some of the nuts.

A gate 35 acts as a control valve for the nuts, being adjustably secured to the housing 10 and projecting in a vertical direction into the hopper to a point close to the rails. A slot 36 and a bolt and nut 37 provide convenient means by which the height of the gate 35 may be regulated. As shown in Fig. 2, its lower end is just above the lower tapered ends of the rails. The purpose of this device is thus to restrict the passageway and control the number of nuts carried up by the belt.

Upon the top of the hopper journals 18 are secured for pivotally mounting a finger or plate 19. An arm 20 and a coil spring 21 tend to hold the plate or finger in a more or less vertical position, this plate or finger swinging into the horizontal position to prevent upward movement of the nuts out of the hopper. There is a tendency for such movement to occur due to the upward travel of the belt, and the provision of the swinging plate or finger prevents loss of any of the nuts while insuring that each cup will carry only a single nut when emerging from the hopper. The free end of the plate 19 or finger approaches the rails and clears the the belt surface as shown in Fig. 2.

The belt carries projecting pins 33 which are preferably staggered so as to effect a certain amount of stirring or agitation of the nuts in the hopper to prevent the nuts from packing. Instead of making the belt out of leather, it may be made of rubber or metal, and I wish the word "belt" to be so construed. Heretofore nut cracking machines have employed endless sprocket chains as feeding means. These chains require sprocket wheels by which they are driven. A distinctive feature of this invention is the fact that the endless belt or chain is driven directly by the movement of the cracking cylinder or drum. I regard this as broadly new in the art.

What is claimed is:

1. A feeding device for nut cracking machines including an endless flexible belt, means carried by the belt for receiving nuts, and means for causing all but one of the nuts in said receiving means to move out of the same.

2. A feeding device for nut cracking machines including an endless flexible belt, a plurality of nut receiving means carried upon the belt, means for driving the belt, means for supporting the nuts in the receiving means for a portion of the travel of the belt, and means whereby when said support is withdrawn the nuts drop directly through the nut receiving means into the pockets of the nut cracking machine.

3. Means for feeding nuts into nut cracking machines of the type employing a rotary drum including a belt directly engaged with and driven by the drum of the cracking machine, means carried by the belt for holding nuts, and means whereby nuts drop by gravity from the holding means into the drum.

4. Means for feeding nuts into nut cracking machines including a belt directly engaged with and driven by the drum of the cracking machine, means carried by the belt for holding nuts, means for causing all but one of the nuts in said holding means to move out of the same, and means for supporting the single nut for a portion of the travel of the belt.

5. Means for feeding nuts into nut cracking machines including a flexible continuous belt directly engaged with and driven by the cracking machine drum which carries the cracking mechanism, means carried by the belt for receiving nuts, and means for delivering the nuts one at a time from the belt to the drum of the nut cracking machine.

6. Means for feeding nuts into nut cracking machines including a driven belt, means carried by the belt for receiving nuts, and means brought into action by the travel of the belt for ejecting all but one of the nuts in each of said receiving means.

7. Means for feeding nuts into nut cracking machines including a driven belt, means carried by the belt for holding nuts, means for causing all but one of the nuts in each of said holding means to move out of the same, and means for supporting a single nut in each of said holding means for a portion of the travel of the belt until it drops into the nut cracking machine.

8. Means for feeding nuts into nut cracking machines including a driven belt, means carried by the belt for holding nuts, means for causing all but one of the nuts in each of said holding means to move out of the same, means for supporting the single nut in each of said holding means for a portion of the travel of the belt, and means for causing gradual lowering of each single nut in its holder and ultimate dropping of said nut out of the holder into the nut cracking machine.

9. Feeding means for nut cracking machines including an endless flexible belt engaged with and driven by the drum of the cracking machine, means on the belt for carrying nuts, and cooperating means on the belt and on the drum whereby each of said nut carrying means is brought adjacent one of the nut receiving sleeves of the machine and whereby the belt cannot slip on said drum.

10. Feeding means for nut cracking machines including an endless flexible belt engaged with and driven by the drum of the cracking machine, means on the belt for carrying nuts, means brought into action by the travel of the belt for ejecting all but one nut out of each carrying means, and cooperating means on the belt and on the drum whereby each of said nut carrying means is brought adjacent one of the nut receiving sleeves of the machine and whereby the belt cannot slip on said drum.

11. Feeding means for nut cracking machines including an endless flexible belt engaged with and driven by the drum of the cracking machine, means on the belt for carrying nuts, means brought into action by the travel of the belt for rejecting all but one nut out of each carrying means, means for supporting each single nut for a portion of the travel of the belt, and cooperating means on the belt and on the drum whereby each of said nut carrying means is brought adjacent one of the nut receiving sleeves of the machine and whereby the belt cannot slip on said drum.

12. Feeding means for nut cracking machines including an endless flexible belt engaged with and driven by the drum of the cracking machine, means on the belt for carrying nuts, means brought into action by the travel of the belt for ejecting all but one nut out of each carrying means, means for causing gradual lowering of each single nut in its holder and ultimate dropping of said nut out of the holder, and cooperating means on the belt and on the drum whereby each of said nut carrying means is brought adjacent one of the nut receiving sleeves of the machine and whereby the belt cannot slip on said drum.

13. Means for feeding nuts including a nut holding hopper, a belt traveling upwardly through said hopper, receptacles carried by said belt at regular intervals for receiving a plurality of said nuts, and means acting upon the nuts at the bottom of the receptacles for forcing all but one of the nuts out of each receptacle.

14. Means for feeding nuts including a nut holding hopper, a belt traveling upwardly through said hopper, and receptacles carried by said belt at regular intervals for receiving said nuts, said receptacles lying below the outer or upper surface of the belt whereby the continuity of said surface is unbroken and provided with open bottoms.

15. Means for feeding nuts including a nut holding hopper, a belt traveling upwardly through said hopper, receptacles carried by said belt at regular intervals for receiving said nuts, and staggered pins fixed upon the belt and projecting above the outer or upper surface of the belt for stirring the nuts in the hopper.

16. Means for feeding nuts including a nut holding hopper, a belt traveling upwardly through said hopper, receptacles carried by said belt at regular intervals for receiving said nuts, said receptacles lying below the outer or upper surface of the belt whereby the continuity of said surface is unbroken, and pins carried by the belt and projecting above the outer or upper surface of the belt for stirring the nuts in the hopper.

17. Means for feeding nuts including a nut holding hopper, a belt traveling upwardly through said hoper, receptacles carried by said belt at regular intervals for receiving a plurality of said nuts, and means supported within the hopper and received within said receptacles during the passage thereof through the hopper for ejecting all but one of the nuts out of each receptacle.

18. Means for feeding nuts including a nut holding hopper, a belt traveling through said hopper, receptacles carried by said belt at regular intervals for receiving a plurality of said nuts, and means supported within the hopper and received within said receptacles during the passage thereof through the hopper for ejecting all but one of the nuts out of each receptacle, said means being provided with a means for gradually lowering a nut within the receptacle.

19. Means for feeding nuts to nut cracking machines having rotary drums which mount the cracking mechanisms, including a nut holding hopper, and an endless flexible belt formed from a strip of homogeneous material, receptacles on the belt for carrying nuts, and cooperating means on the belt and on the drum of the cracking machine whereby the belt is directly driven by the drum without slipping.

20. Means for feeding nuts to nut cracking machines including a belt, a hopper through which the belt passes, means on the belt for receiving nuts from the hopper so that they may be conveyed out of the hopper to the cracking mechanism, said belt being positively driven by a rotary part of the nut cracking machine and depending loosely from said part.

21. Means for feeding nuts to nut cracking machines, including a hopper for holding a supply of nuts, a driven belt in communication with said hopper, receptacles on the belt for carrying nuts, and means along which the belt travels for engaging the nuts in each receptacle to lift the same whereby all but the lowermost of the nuts is pushed out of each receptacle.

22. Means for feeding nuts to nut cracking machines, including a hopper for holding a supply of nuts, a driven belt in communication with said hopper, receptacles on the belt for carrying nuts, and a rail having beveled lower ends along which the belt travels for engaging the nuts in each receptacle to lift the same whereby all but the lowermost of the nuts is pushed out of each receptacle.

23. Means for feeding nuts to nut cracking machines, including a hopper for holding a supply of nuts, a driven belt in communication with said hopper, receptacles on the belt for carrying nuts, said receptacles being slotted, and a pair of parallel rails set edgewise and extending longitudinally in the direction of travel of the belt and adapted to enter the slots of the receptacles whereby all the nuts in the receptacles are lifted and all are pushed out except the nut adjacent the upper edges of the rails.

24. Means for feeding nuts to nut cracking machines, including a hopper for holding a supply of nuts, a driven belt in communication with the hopper, receptacles on the belt for carrying nuts, said receptacles being slotted, and a pair of parallel rails set edgewise and extending longitudinally in the direction of travel of the belt and adapted to enter the slots of the receptacles whereby all the nuts in the receptacles are lifted and all are pushed out except the nut adjacent the upper edges of the rails, each rail being beveled at its lower end and rounded off gradually at its upper end.

25. Means for feeding nuts to nut cracking machines, including a nut holding hopper having an opening at the lower end and an inclined side, a belt entering said opening and traveling upwardly along said side, receptacles on the belt for carrying nuts and depending below the outer surface of the belt, and a rail set edgewise in the hopper and extending longitudinally in the direction of travel of the belt, said rail projecting into the receptacle and engaging the lowermost nut carried by each receptacle to force all the other nuts therein back into the hopper.

26. Means for feeding nuts to nut cracking machines, including a nut holding hopper having an opening at the lower end and an inclined side, a belt entering said opening and traveling upwardly along said side, receptacles on the belt for carrying nuts, and a rail set edgewise in the hopper and extending longitudinally in the direction of travel of the belt and above the hopper, said rail engaging the lowermost nut carried by each receptacle to force all the other nuts therein back into the hopper, each rail being beveled at its lower end and rounded off gradually at its upper end, whereby the uppermost nuts are first pushed out and then the single nut in each receptacle is slid over the rail edge until the receptacle is out of the hopper, and then each single nut is gradually lowered in its receptacle and ultimately allowed to drop.

27. Feeding means for nut cracking machines including a hopper for holding a supply of nuts, said hopper having an inclined wall and a passageway at the lower end of said wall, a belt movable through the passageway, means for driving the belt upwardly through the hopper, means carried by the belt for receiving a plurality of nuts, said means being bottomless, the inclined wall forming a bottom for the nut receiving means for a portion of their upward travel, and means secured to the inclined wall and on which the nut receiving means may slide to provide a bottom therefor as the nut receiving means rise out of the hopper.

28. Feeding means for nut cracking machines including a hopper for holding a supply of nuts, said hopper having an inclined wall and a passageway, a driven belt movable through said passageway and upwardly through the hopper, cups carried by the belt for receiving the nuts, and a gate held vertically within the hopper and adjustable up and down therein toward and from the belt to regulate the tendency of the nuts to be carried upwardly by the belt and to sub-divide the nuts in the hopper.

29. Feeding means for nut cracking machines including a hopper for holding a supply of nuts, a driven belt movable through the hopper, cups carried by the belt for receiving the nuts, and means mounted at the top of the hopper near the place where the belt rises out of the hopper and acting to prevent nuts from being thrown out of the hopper by the upward movement of the belt.

30. Feeding means for nut cracking machines including a hopper for holding a supply of nuts, a driven belt movable upwardly through the hopper, cups carried by the belt for receiving the nuts, a gate held vertically within the hopper and adjustable up and down therein toward and from the belt to sub-divide the nuts in the hopper, and a plate pivotally mounted at the top of the hopper near where the belt rises out of the hopper and acting to prevent nuts from being thrown out by the upward movement of the belt.

31. Feeding means for nut cracking machines including a hopper for holding a supply of nuts, a belt, means for driving the belt upwardly through the hopper, means carried by the belt for receiving nuts, said means being bottomless and slotted, one wall of the hopper forming a bottom for the nut-receiving means for a portion of their upward travel, and a rail secured to said wall and entering the slots of the nut-receiving means, whereby said means may slide upon the rail and be guided thereby, said rail providing a bottom for the receiving means during the engagement of the latter with the rail.

32. Feeding means for nut cracking machines including a hopper for holding a supply of nuts, a belt, means for driving the belt upwardly through the hopper, means carried by the belt for receiving the nuts, said means being bottomless and having slots, the inclined wall forming a bottom for the nut-receiving means for a portion of their upward travel, a rail secured to the inclined wall and projecting above the hopper, said rail engaging with the slots of the receiving means to guide and support the same and provide a bottom therefor, said rail having a rounded upper end whereby as the receiving means approach said end the nuts in said means sink down gradually therein and are ultimately allowed to drop.

33. Feeding means for nut cracking machines having cracking drums, including a hopper, a belt driven upwardly through the hopper, a rail secured within the hopper and extending out of the top thereof in a line substantially tangent to the drum of the nut cracking machine, and means on the belt for holding nuts, said means being slidable over the rail whereby the latter serves as a bottom for the holding means and whereby when the end of the rail is reached the nuts are dropped into the drum.

34. In combination with a nut cracking machine having a rotary drum, feeding means including a hopper, a belt movable upwardly through the hopper, said belt passing over the drum and being driven thereby, cooperating means on the belt and drum for preventing slipping of the belt, a rail secured within the hopper and extending out of the top thereof in a line substantially tangent to the drum, and means on the belt for holding nuts, said means being slidable over the rail whereby the latter serves as a bottom for the holding means and whereby when the end of the rail is reached the nuts are dropped to the drum.

35. In combination with a nut cracking machine having a rotary drum, feeding means including a hopper, a belt movable upwardly through the hopper, said belt passing over the drum and being driven thereby, cooperating means on the belt and drum for preventing slipping of the belt, a rail secured within the hopper and extending out of the top thereof in a line substantially tangent to the drum, means on the belt for holding nuts, said means being slidable over the rail whereby the latter serves as a bottom for the holding means and whereby when the end of the rail is reached the nuts are dropped to the drum, said rail having its upper end curved and brought to a point so that as each holding means travels to said end the nut therein is gradually lowered and ultimately allowed to drop into the drum whereby possibility of rebounding of the nuts is eliminated.

36. Means for feeding nuts to cracking machines including a belt, a series of regularly spaced cups or receptacles carried upon the belt, each cup being oval or elliptical in horizontal section and extending transversely of the belt, and arranged below the outer or upper surface of the belt, the dimensions of the cups being sufficient to admit two or more nuts but with only one nut on a given level.

37. Means for feeding nuts to cracking machines including a belt, a series of regularly spaced cups or receptacles carried upon the belt, each cup being oval or elliptical in horizontal section and set transversely of the belt, the length and width of each cup being sufficient to admit a single nut on a level, the depth of the cups being sufficient to receive two or more nuts, the upper edge of each cup being level with the outer face of the belt and the lower edge projecting from the under side of the belt, each cup being slotted at opposite points on its longitudinal walls.

38. In a nut cracking machine employing a rotary drum or carrier for the cracking mechanism, the combination therewith of a nut conveying belt passing across said drum, and cooperating means on said drum and belt whereby the latter is driven solely by the means which actuate said drum.

39. In a nut cracking machine employing a rotary drum or carrier for the cracking mechanism, the combination therewith of a belt having cups to receive nuts and deliver them to the cracking mechanism associated with the drum, said belt passing over said drum and in contact therewith, and teeth on the drum and openings in the belt whereby the drum and belt are caused to move in unison, the drum constituting the sole driving means for said belt.

In testimony, that I claim the foregoing as my own, I have hereto affixed my signature.

EMIL PHILLIPPE.